United States Patent
Schwartz

[15] 3,690,366
[45] Sept. 12, 1972

[54] PRODUCTION OF MOLDS
[72] Inventor: Carl H. Schwartz, Toledo, Ohio 43615
[73] Assignee: Dentsply Research Development Corporation, Milford, Del.
[22] Filed: Oct. 10, 1969
[21] Appl. No.: 865,514

[52] U.S. Cl. .................164/25, 106/38.35, 164/35
[51] Int. Cl. .................................................B22c 9/02
[58] Field of Search .164/24, 25, 26; 106/38.3, 38.35

[56] References Cited

UNITED STATES PATENTS

| | | | |
|---|---|---|---|
| 2,851,752 | 9/1958 | Benham | 164/25 |
| 3,077,648 | 2/1963 | Sutherland | 164/26 |
| 3,148,422 | 9/1964 | Payne | 164/26 |
| 3,209,421 | 10/1965 | Shepherd | 164/25 X |
| 3,270,382 | 9/1966 | Emblem et al. | 164/26 |
| 3,509,935 | 5/1970 | Halsey | 164/25 |
| 2,842,445 | 7/1958 | Emblem et al. | 106/38.35 |
| 3,232,771 | 2/1966 | Pearce | 106/38.35 |

FOREIGN PATENTS OR APPLICATIONS

| | | | |
|---|---|---|---|
| 551,728 | 1/1958 | Canada | 164/25 |
| 669,130 | 3/1952 | Great Britain | 164/25 |
| 580,058 | 8/1946 | Great Britain | 106/38.35 |

Primary Examiner—J. Spencer Overholser
Assistant Examiner—John E. Roethel
Attorney—Owen and Owen

[57] ABSTRACT

A method of producing precision casting molds from a mixture of a comminuted refractory material, a lower alkyl silicate binder and a gelling accelerator. The proportion of lower alkyl silicate used, and the mean effective particle size and particle size distribution of the refractory are both carefully controlled. Specifically, the proportion of lower alkyl silicate used is kept sufficiently low that the mixture, when placed against a pattern and allowed to gel, does not crack upon prolonged standing under ambient conditions, while a refractory is used substantially all of which is finer than 8 mesh and in which the particle size is graduated so that a substantial proportion is finer than 200 mesh and a substantial proportion is coarser than 100 mesh, while the bulk density is sufficiently high that, at the required low proportion of alkyl silicate, the mixture can be placed in mold-forming relationship with a pattern and, upon gelling of the alkyl silicate, will form a rigid mold. Apart from control of the proportion of lower alkyl silicate used and of particle size of the refractory, the process is conventional, and involves producing the mixture, applying the mixture in mold-forming relationship to a pattern, allowing the lower alkyl silicate to gel, and ultimately firing the mold.

9 Claims, No Drawings

PRODUCTION OF MOLDS

BACKGROUND OF THE INVENTION

1. Field of the Invention

This invention relates to investment compositions for refractory molds used in precision or investment casting of metals and metal alloys, and to the method of making the molds.

2. Description of the Prior Art

There are several processes currently available for use in precision casting metals and metal alloys. One such method involves the making of refractory molds for casting metals by admixing comminuted refractory material with an organic silicate and sufficient water to hydrolyze the silicate. To the mixture is added a gelling accelerator such as hydrochloric acid, lime or magnesia, and a mold is formed from the resulting semi-liquid paste or slurry by intimately applying the slurry to a pattern and allowing it to set, the setting being effected by the induced hydrolysis and the gelling of the silicate. The mold material is allowed to set, and is then stripped from the pattern and the mold is subjected to a drying process.

One of the problems inherent in this method of making molds, however, it is that unless the drying is carefully regulated, cracks appear in the mold, thus preventing a uniform surface from being achieved on the metal which is poured into the refractory mold. That is, the metal flows into the cracks, and ridges are formed on the surface of the casting. Sometimes the drying and cracking result in the complete destruction of the mold and other times only in the disfigurement of the face of the metal which is molded. It has been suggested in order to minimize the cracking of the mold that a binder be used which is composed of a lower alkyl silicate which yields an alcohol on hydrolysis and which is sufficiently volatile to burn when ignited. This binder is mixed with a gelling agent and the refractory material to form a slurry which is then placed against a pattern; as soon as the mold has set it is separated from the pattern and immediately subjected to a rapid uniform and intense flame firing whereby all of the volatile escapes from the set mold as a result of the rapid burning and intense heat. This presumably causes a dimensional "freezing", and the mold so produced has micro-cracks or crazing which renders it immune to subsequent severe thermal shocks.

This method of producing a mold requires the immediate and specialized firing, which is often inconvenient, undesirable, or both. In addition, extreme precaution is necessary because ignition of the volatile materials is a serious fire hazard, especially when large quantities of the material are present.

The present invention is based upon the discovery of a new method of producing refractory molds which is unexpectedly advantageous by comparison with the prior art.

OBJECTS

An object of this invention is the provision of a new and useful method for making refractory molds.

Another object of this invention is to provide a novel investment composition which has a predetermined low binder to refractory material ratio.

Another object of this invention is to provide a novel investment composition that undergoes a minimum amount of shrinkage upon drying, thereby permitting the use of disposable patterns which need not be separated from the slurry after gelling of the latter, and prior to firing.

Another object of this invention is to provide a method of making refractory molds using one of several specific mixtures of refractory materials and in which the volatile materials may be driven off in a flameless manner.

Another object of the invention is to provide improvements of the character set forth which enable precision casting of articles from extremely hard metals which are difficult to finish, whereby such articles are cast consistently with a high degree of surface smoothness and detail, and require little, if any, finishing after the casting operation.

Further objects and advantages of the invention will become apparent from the following description.

SUMMARY OF THE INVENTION

In general, the method of this invention involves mixing a comminuted refractory material with a lower alkyl silicate binder and a gel accelerator, placing the resulting mixture in mold-forming relationship against a pattern, allowing the lower alkyl silicate to gel, and ultimately firing the mold. The proportion of the lower alkyl silicate used is controlled to one sufficiently low that the unfired mold, upon prolonged standing under ambient conditions, does not crack or warp, and the mean effective particle size and particle size distribution of the refractory are controlled to minimize the void space existing in the bulk of the refractory employed so that the mixture, when appropriately placed against a pattern, forms a mold upon gelling of the lower alkyl silicate. The criticality of the proportion of lower alkyl silicate to refractory material and of the particle size and size distribution of the refractory, will be apparent from Example 1, below, and from the two comparative procedures, not according to the invention, described thereafter. In Example 1, and elsewhere herein, the terms "parts" and "percent" are used to refer to parts and percent by weight, unless otherwise indicated. All mesh sizes given herein, and referred to in the appended claims, refer to the U.S. Sieve Series.

EXAMPLE I

A binder was prepared from 575 ml. of a solvent mixture (a water-white liquid composed of 100 parts denatured ethyl alcohol, 5 parts ethyl acetate, and 1 part aviation gasoline. It has a specific gravity of 0.816, a boiling point of 70°–80°F., a flash point of 70°F., and weighs 6.81 lbs/gal.) 25 ml. 0.5 percent hydrochloric acid and 400 ml. 40 percent ethyl silicate. The solvent mixture and the hydrochloric acid were mixed together, and the resulting mixture was then slowly added, with constant stirring, to the ethyl silicate. The resulting binder was allowed to age by standing overnight.

A particulate refractory material was prepared by mixing for 30 minutes in a ribbon-type blender 30 parts of C–6 wollastonite and 70 parts of C–101 wollastonite(Cabot). The C–6 wollastonite is a minus 200 mesh material, 97.7 percent thereof passing through a 200 mesh screen, while the C–101 wollastonite is a 20/200 material. The screen analysis of C–101 wollastonite is as follows:

| | |
|---|---|
| plus 20 mesh screen | 22.6 |
| minus 20 plus 45 mesh screen | 46.4 |
| minus 45 plus 100 mesh screen | 22.4 |
| minus 100 plus 200 mesh screen | 7.1 |
| minus 200 mesh screen | 1.5 |

An addition of a 7.5 percent solution of ammonium carbonate was then made to the ethyl silicate binder prepared as described above. The ammonium carbonate acts as a gelling agent, and the amount added had been determined empirically to be one which would provide a gel time of about 3 minutes, which has been found to provide a reasonable working time for the production of small molds. The 23 ml. of ethyl silicate binder, with ammonium carbonate gelling agent added, was then mixed with 100 g. of the blended wollastonite refractory produced as described above, and the materials were blended by manual stirring for approximately 30 seconds. Master patterns which had been cleaned and sprayed with a light layer of a silicone release agent were then placed upon a vibrating table; the mixed binder and wollastonite was poured on the table so that it would flow over the surface of the mold; and vibration was continued for 2 minutes after pouring of the binder-wollastonite composition. Approximately 10 minutes after vibration was discontinued, the ethyl silicate had gelled sufficiently that a rigid mold surrounded the master pattern, and this mold was separated from the pattern. The mold was found to be dimensionally stable and not subject to visible cracking upon prolonged standing under ambient conditions. The mold was eventually fired at 1,300°F. for 1½ hours, and was then degassed under vacuum after it had cooled to about 650°F.

A casting of a beryllium copper 20C alloy made in the mold produced as described above, and poured at a temperature of about 2000°F., had a good surface luster, and a minimum of discoloration, and was of sufficient precision for use as a dental casting.

For purposes of comparison, but not in accordance with the instant invention, an attempt was made to produce a mold by the procedure described above, except that the wollastonite refractory was a mixture of 30 parts of the C-101 wollastonite with 70 parts of the C-6 wollantonite. The mixture of wollastonite and binder which was produced was a thick, semi-fluid material, but insufficiently fluid in nature to be usable for the production of a mold by the procedure described above. In the language of the art, the mixture of ethyl silicate binder composition, gelling agent and particulate refractory was not "placeable".

Again, for purposes of comparison, but not according to the invention, attempts were made to produce a mold from the same blend of 30 parts of C-101 wollastonite with 70 parts of C-6 wollastonite. It was found to be necessary to use 38 ml. of the ethyl silicate binder produced as described above with 100 g. of this blend of wollastonite particles to produce a mixture which was sufficiently fluid in nature to be usable by the method described above to produce a mold. The resulting mold, however, shortly after gelling of the ethyl silicate, began to warp and crack, so that a usable mold could not be produced without resort to the undesirable prior art expedient of separating the mold from the pattern as soon as possible, and then subjecting the separated mold immediately to a rapid, uniform and intense-flame firing.

It has been found that the maximum amount of lower alkyl silicate binder composition that can be used with any given particulate, refractory material to produce a mold by the procedure described above, which mold will neither crack nor warp upon prolonged standing under ambient conditions is a function of the bulk density of the refractory material, where the bulk density is the weight in grams per ml. of the refractory material, and is determined by gradually filling a 250 ml. glass graduate to the 200 ml. mark with the refractory material in question, while gently tapping the graduate: the weight of the refractory material, by this test, is two hundred times the bulk density of the material. The bulk density of a given material is a function of its true density, the shape of the individual particles, and the particle size distribution, that is to say, the void space existing for a given weight of the refractory in question is a function of all of these factors.

From repeated tests it was determined empirically that the maximum number of ml. of a lower alkyl silicate binder composition that can be used with 100 g. of any given particulate refractory material, regardless of its chemical composition, without cracking and/or warping occurring in the set and dried mold, is 33.6 divided by the bulk density of the refractory material in question. This empirical formula was derived by choosing a blend of refractories having one of the highest bulk densities (2.8 g/ml.) of the refractories commonly employed in the trade, and then determining the maximum percentage of liquid that could be used without the occurrence of warping and/or cracking in the cured mold. In this particular case, 12 percent of liquid was found to be the maximum permissible. It was assumed, and then verified, that the maximum permissible amount of liquid with other refractories would vary with bulk density so that if $y$ equals bulk density and $x$ equals the maximum permissible number of ml. of liquid per 100 g. of the refractory, $x = 12[2.8]/y$ or $x = 33.6/y$. Applying this formula to the wollastonite blend used in the procedure of Example 1 and in the two foregoing comparison procedures: the Example 1 wollastonite blend had a bulk density of 1.47, so that the maximum amount of the ethyl silicate binder that could be used with 100 g. of the refractory material was 23 ml., the amount actually used in Example 1; the wollastonite blend used in the two comparison procedures had a bulk density of 1.32, so that the indicated maximum amount of the ethyl silicate binder that could be used with 100 g. of the wollastonite material was 25 ml. Since the wollastonite of the two comparison procedures required 38 ml. ethyl silicate binder per 100 g. of the refractory, this wollastonite blend was not suitable for use in practicing the method of the instant invention; its bulk density was too low. The bulk density of the C-101 wollastonite is 1.48 while that of the C-6 wollastonite is 1.04.

The method of the instant invention has also been practiced using various blends of particulate refractory materials other than the blend specifically identified in Example 1, above. The various particulate refractory materials used are identified in Table 1 below, chemically, by supplier, by trade designation analysis and bulk density:

TABLE 1

| | trade | Cumulative percent on |

| | Bulk density | Bulk designation | Supplier | indicated mesh (unless otherwise indicated) |
|---|---|---|---|---|
| Calcined aluminum silicate (35 mesh: fireclay) | 1.49 | Cal-22S | Harbison Walker | 99 on 50<br>86 on 40<br>58 to 72 on 30<br>17–23 on 20<br>trace on 16 |
| Milled ortho-zirconium silicate (325 mesh) | 2.18 | 325 Zircon Gran | Frank Samuel | 95 percent through 325 mesh |
| Granular ortho-zirconium silicate | 2.88 | -ular Zircon | Frank Samuel | 100 on 200<br>96 on 140<br>86 on 100<br>26 on 70<br>1 on 50 |
| Calcined aluminum silicate (60 mesh: fireclay) | 1.30 | Cal-amo 60 | Harbison Walker | 98 on 140<br>65 to 90 on 70<br>2 on 40 |
| Milled ortho-zirconium silicate (200 mesh) | 2.50 | 200 Zircon | Frank Samuel | 95 % through 200 mesh |
| Calcined aluminum silicate (200 mesh: fireclay) | 1.35 | Cal-amo 200 | Harbison Walker | 97 % through 200 mesh<br>3 on 200 |
| Calcined kaolin 16/30 | 1.31 | molo-chite 16/30 | Hammill & Gillespie | 100 on 60<br>85 on 30<br>15 and 16<br>0 on 8 |
| Calcined kaolin 60/80 | 1.22 | molo-chite 60/80 | Hammill & Gillespie | 97 on 140<br>80 on 80<br>75 on 60<br>2 on 40 |
| Calcined kaolin 200 | 1.23 | molo chite 200 | Hamill & Gillespie | 95 % through 300 mesh<br>5 on 300<br>2 on 200 |
| Calcined aluminum silicate (fireclay) 16/50 | 1.48 | Fl-int-grain 1805 | Harbison Walker | 98 on 50<br>90 on 40<br>58 to 72 on 30<br>17 to 23 on 20<br>trace on 16 |
| Fused silica 50/100 | 1.18 | Ran-co-Sil A | Ransom & Randolph | 99 on 200<br>98 on 140<br>95 on 100<br>10 on 50 |
| Fused silica 200 | 1.00 | Ran-co-Sil 4 | Ransom & Randolph | 99 percent through 200 mesh |
| Quartz 50 | 1.67 | 50 Wedron Silica | Wedron | 99 on 100<br>98 on 70<br>90 on 50<br>38 on 40 |
| Quartz 200 | 1.28 | 200 Wedron Silica | Wedron | 80 percent through 325 mesh<br>20 on 325<br>11 on 270<br>5 on 200<br>1 on 140 |
| Quartz 20/100 | | Silica Q-Rock | Pa. Pulverizing | 1 percent through 120 mesh<br>99 on 120 mesh<br>97 on 60<br>89 on 40<br>54 on 30<br>6 on 20<br>0 on 10 |

Typical particulate, refractory compositions which have been used in producing molds according to the invention, and by the procedure described in Example 1, above, are presented in Table 2, below, together with the bulk density of each composition, the maximum permissible amount of lower alkyl silicate binder, as indicated by the formula set forth above, and the amount of the previously identified ethyl silicate binder composition that was used to produce a mold which neither cracked nor warped upon prolonged standing under ambient conditions.

Generally speaking, the finer the particle size of a given refractory, the lower bulk density, but the lower bulk density, the higher the liquid requirement to yield a fluid mixture. Often this results in a liquid requirement in excess of that computed by the foregoing empirical formula. However, by increasing the proportion of coarse to fine particles, it may be possible to lower the amount of liquid required to yield a fluid consistency to a value below the computed safe maximum. The proportion of fine grains must, however, be sufficiently high that the required smoothness of surface is achieved in the finished mold.

TABLE 2 parts of indicated refractory
Example Nos.

| | 2 | 3 | 4 | 5 | 6 | 7 |
|---|---|---|---|---|---|---|
| Calcined aluminum silicate (35 mesh: fireclay) | 45 | 30 | | | | |
| Milled ortho-zirconium silicate (325 mesh) | 30 | | | | | |
| Granular ortho-zirconium silicate | 25 | 35 | | | | |
| Calcined aluminum silicate (fireclay) 16/50 | | 30 | | | | |
| Milled ortho-zirconium silicate (200 mesh) | | 35 | | | | |
| Calcined aluminum silicate (60 mesh: fireclay) | | | 35 | | | |
| Calcined aluminum silicate (200 mesh: fireclay) | | | 35 | | | |
| Calcined kaolin 16/30 | | | | 30 | | |
| Calcined kaolin 60/80 | | | | 35 | | |
| Calcined kaolin 200 | | | | 35 | | |
| Fused silica 50/200 | | | | | 60 | |
| Fused silica 200 | | | | | 40 | |
| Quartz 20/100 | | | | | | 30 |
| Quartz 50 | | | | | | 35 |
| Quartz 200 | | | | | | 35 |
| Bulk density | 2.7 | 2.8 | 1.6 | 1.5 | 1.3 | 1.7 |
| Maximum amount (ml.) of lower alkyl silicate binder with 100 gm. refractory indicated by formula | 12.5 | 12 | 21 | 22 | 25 | 20 |
| Ml. lower alkyl silicate binder employed | 12.5 | 12 | 21 | 22 | 25 | 20 |

It will be appreciated from the foregoing discussion that, if it is desired to use the method of the present invention in producing a mold from a particulate refractory composition other than one of those identified above, it is necessary to control both the proportion of the lower alkyl silicate binder used and the particle size and size distribution of the particulate refractory with which it is desire to work. For example, it may be desirable to use calcined alumina as the particulate refractory material in producing a mold according to the invention. If so, a screen analysis should first be run, and any significant proportion thereof coarser than 6 mesh should be discarded. In most cases it will be found that a single refractory does not contain a sufficient proportion of particles finer than 200 mesh and also a sufficient proportion of particles coarser than 100 mesh. As a consequence it is usually necessary to blend two or more particulate refractory materials in order to provide the requisite particle size distribution. Desirably, the refractory contains at least 15 percent of minus 200 mesh material and at least 15 percent of material coarser than 100 mesh. Preferably, the refractory contains at least 20 percent of material finer than 300 mesh, at least 20 percent of material finer than 100 mesh but coarser than 300 mesh, and at least 20 percent of material coarser than 100 mesh. When an appropriate particulate refractory material, e.g., of calcined alumina, has been formulated, from the standpoint of particle size distribution, the bulk density should be determined by the method described above. From the bulk density, so determined, the maximum proportion of lower alkyl silicate binder that can be used with 100 g. of the refractory material is calculated, and a determination is made as to whether or not a mixture of the indicated amount of the lower alkyl silicate binder with the refractory is "placeable". If so, it is then possible to practice the method of the invention with that particular refractory material. If not, it is necessary to increase the bulk density of the calcined alumina refractory material. It will be appreciated from the foregoing detailed disclosure that the bulk density of the calcined alumina refractory material can be increased by blending coarser alumina with the material which was found to be too fine or, as is usually preferred, by changing the proportions in which relatively coarse alumina and relatively fine alumina are blended to produce the particulate refractory material in question.

The chemical identities of the refractory materials, of the lower alkyl silicate binders, of the gelling agent or agents and the like are not critical in practicing the method of the invention. As a practical matter, ethyl orthosilicate is a preferred lower alkyl silicate because of availability and for reasons of economics, but other lower alkyl silicate solutions are also operable, for example, those in which the alkyl group has from one to four carbon atoms, the concentration of the lower alkyl silicate in the binder composition is not critical, but comparatively high concentrations, e.g. from about 12 percent to about 20 percent are desirable so that adequate bonding is achieved at the low alkyl silicate solution to particulate refractory ratios which are required in practicing the instant method. Examples of suitable refractories include alumina, silica, zirconia, fused magnesia, kaolinite, sillimanite, mullite, silicon carbide, zirconium silicate, titanium silicate, the spinels, chromium oxide, andalusite, bauxite.

A minor amount of an acid, e.g. the hydrochloric acid described in Example 1, or of sulfuric acid, phosphoric acid, lactic acid or the like is desirably used so that a hydrosilicic acid gel is formed. High acid content in the alkyl silicate binder composition is undesirable, because it may cause almost instantaneous gelling upon addition of the gelling agent.

Suitable gelling agents or gelling accelerators that can be used in place of the ammonium carbonate employed in the Example 1 procedure include calcium carbonate, calcium chloride, magnesium oxide, magnesium carbonate, sodium carbonate, carbonic acid, hydrochloric acid and like materials which affect the pH of the colloidal ethyl silicate solution, or react therewith to form mineral silicates. In general, electrolyte reactants are good accelerators, some more effective than others. Accelerators and the like are normally employed in such proportions that they constitute from about 0.01 percent to about 1 percent of the entire binder composition.

In the procedure described above in detail, Example 1, vibration was used in producing a mold according to the method of the invention. As indicated above, vibration was also used in producing the molds by the method summarized in the foregoing Table, Examples 2 through 7. The procedure of Example 3 has also been repeated, except that the number of ml. lower alkyl silicate binder composition used per 100 grams of the refractory material was increased from 12 to 15, and except that vibration was not employed in producing the mold. A completely satisfactory mold was produced, and the mold was not subject to cracking or warping upon prolonged standing under ambient conditions. However, when the procedure was repeated again, using the 15 ml. lower alkyl silicate binder per 100 grams refractory material, and the pattern was vibrated during the mold formation period, an unsatisfactory result was achieved: the final mold cracked and warped after only a short period of standing under ambient conditions. Obviously some settling of the refractory occurred during vibration, and in the upper portions of the mold, the percentage of liquid in these regions exceeded the safe maximum computed from the formula. It will be appreciated, therefore, that some variation in the proportion of lower alkyl silicate binder to refractory material can be tolerated if the precise mold producing procedure is varied. The empirical formula set forth above has been verified with a procedure which includes vibration of the pattern and mold forming mixture during the gelling operation. It will be appreciated that slightly higher proportions of the lower alkyl silicate binder can be used, and may be preferred, if the pattern and mold making mixture are not vibrated.

I claim:

1. In a method for producing a refractory mold which comprises preparing a slurry of a particulate refractory composition, a lower alkyl silicate binder having from 1 to 4 carbon atoms and a gelling agent, packing the slurry against a pattern, and firing the gelled slurry, the improvement of using an amount of the binder expressed as mls. which does not exceed $33.6/y$ per 100 gram of said particulate refractory composition where y is the bulk density in grams per cc. of the refractory, using a refractory having a bulk density of from 1 to about 3.5, essentially all of which is finer than 8 mesh, and controlling the particle sizing of the refractory to provide a bulk density sufficiently high that the slurry is placeable at such proportion of lower alkyl silicate to particulate refractory composition, whereby the necessity for immediate separation of the pattern from the mold and immediate firing of the mold after gelling of the slurry are eliminated, as well as the necessity for accomplishing the firing in such a manner that the alcohol formed by hydrolysis of the lower alkyl silicate is burned rapidly.

2. In a method as claimed in claim 1, the improvement wherein the pattern is separated from the slurry after gellation thereof to a rigid condition.

3. In a method as in claim 1, the improvement of using not more than 23 ml of the lower alkyl silicate binder per 100 gm. of the particulate refractory composition so that the mold, before firing, does not crack upon prolonged standing under ambient conditions, and of using as the refractory a blend of 30 parts of minus 200 mesh wollastonite and 70 parts of wollastonite having the following particle sizing:

| | |
|---|---|
| plus 20 mesh screen | 22.6 |
| minus 20 plus 45 mesh screen | 46.4 |
| minus 45 plus 100 mesh screen | 22.4 |
| minus 100 plus 200 mesh screen | 7.1 |
| minus 200 mesh screen | 1.5 |

4. In a method as in claim 1, the improvement of using not more than 12.5 ml. of the lower alkyl silicate binder per 100 gram of the refractory composition so that the mold, before firing, does not crack upon prolonged standing under ambient conditions, and of using as the refractory a blend of 30 parts of minus 325 mesh milled orthozirconium silicate, 25 parts of granular orthozirconium silicate having the following particle sizing:

| | |
|---|---|
| plus 50 mesh screen | 1 |
| minus 50 plus 70 mesh screen | 25 |
| minus 70 plus 100 mesh screen | 60 |
| minus 100 plus 140 mesh screen | 10 |
| minus 140 plus 200 mesh screen | 4 | and 45 parts of calcined aluminum silicate having the following particle sizing:

| | |
|---|---|
| plus 16 mesh screen | Trace |
| minus 16 plus 20 mesh screen | 17–23 |
| minus 20 plus 30 mesh screen | 41–49 |
| minus 30 plus 40 mesh screen | 28–14 |
| minus 40 plus 50 mesh screen | 13. |

5. In a method as in claim 1, the improvement of using not more than 12 ml. of the lower alkyl silicate binder per 100 gram of the refractory composition so that the mold, before firing, does not crack upon prolonged standing under ambient conditions, and of using as the refractory a blend of 35 parts of minus 200 mesh milled orthozirconium silicate, 35 parts of granular orthozirconium silicate having the following particle sizing:

| | |
|---|---|
| plus 50 mesh screen | 1 |
| minus 50 plus 70 mesh screen | 25 |
| minus 70 plus 100 mesh screen | 60 |
| minus 100 plus 140 mesh screen | 10 |
| minus 140 plus 200 mesh screen | 4 | and 30 parts of calcined aluminum silicate having the following particle sizing:

| | |
|---|---|
| plus 16 mesh screen | Trace |
| minus 16 plus 20 mesh screen | 17–23 |
| minus 20 plus 30 mesh screen | 41–49 |
| minus 30 plus 40 mesh screen | 28–14 |
| minus 40 plus 50 mesh screen | 8. |

6. In a method as in claim 1, the improvement of using not more than 21 ml. of the lower alkyl silicate binder per 100 gram of the refractory composition so that the mold, before firing, does not crack upon prolonged standing under ambient conditions, and of using as the refractory a blend of 30 parts of calcined aluminum silicate having the following particle sizing:

| | |
|---|---|
| plus 16 mesh screen | Trace |
| minus 16 plus 20 mesh screen | 17–23 |
| minus 20 plus 30 mesh screen | 41–49 |
| minus 30 plus 40 mesh screen | 28–14 |
| minus 40 plus 50 mesh screen | 13 |

35 parts of calcined aluminum silicate have the following particle sizing:

| | |
|---|---|
| plus 40 mesh screen | 2 |
| minus 40 plus 50 mesh screen | 32–48 |
| minus 50 plus 70 mesh screen | 31–40 |
| minus 70 plus 140 mesh screen | 33–8 | and 35 parts of calcined aluminum silicate:

| | |
|---|---|
| minus 200 mesh screen | 97 |
| plus 200 mesh screen | 3. |

7. In a method as in claim 1, the improvement of using not more than 22 ml. of the lower alkyl silicate binder per 100 gram of the refractory composition so that the mold, before firing, does not crack upon prolonged standing under ambient conditions, and of using as the refractory a blend of 30 parts of calcined kaolin having the following particle sizing:

| | |
|---|---|
| plus 8 mesh screen | 0 |
| minus 8 plus 16 mesh screen | 15 |
| minus 16 plus 30 mesh screen | 70 |
| minus 30 plus 60 mesh screen | 15 |

35 parts of calcined kaolin having the following particle sizing:

| | |
|---|---|
| plus 40 mesh screen | 2 |
| minus 40 plus 60 mesh screen | 73 |
| minus 60 plus 80 mesh screen | 5 |
| minus 80 plus 140 mesh screen | 17 | and 35 parts of calcined kaolin having the following particle sizing:

| | |
|---|---|
| plus 200 mesh screen | 2 |
| minus 200 plus 300 mesh screen | 3 |
| minus 300 mesh screen | 90. |

8. In a method as in claim 1, the improvement of using not more than 25 ml. of the lower alkyl silicate binder per 100 gram of the refractory composition so that the mold, before firing, does not crack upon prolonged standing under ambient conditions, and of using as the refractory a blend of 40 parts of minus 200 mesh fused silica and 60 parts of fused silica having the following particle sizing:

| | |
|---|---|
| plus 50 mesh screen | 10 |
| minus 50 plus 100 mesh screen | 85 |
| minus 100 plus 140 mesh screen | 3 |
| minus 140 plus 200 mesh screen | 1. |

9. In a method as in claim 1, the improvement of using not more than 20 ml. of the lower alkyl silicate binder per 100 gram of the refractory composition so that the mold, before firing, does not crack upon prolonged standing under ambient conditions, and of using as the refractory a blend of 30 parts of quartz having the following particle sizing:

| | |
|---|---|
| plus 10 mesh screen | 0 |
| minus 10 plus 20 mesh screen | 6 |
| minus 20 plus 30 mesh screen | 48 |
| minus 30 plus 40 mesh screen | 35 |
| minus 40 plus 60 mesh screen | 8 |
| minus 60 plus 120 mesh screen | 2 |
| minus 120 mesh screen | 1 |

35 parts of quartz having the following particle sizing:

| | |
|---|---|
| plus 140 mesh screen | 1 |
| minus 140 plus 200 mesh screen | 4 |
| minus 200 plus 270 mesh screen | 6 |
| minus 270 plus 325 mesh screen | 9 |
| minus 325 mesh screen | 80 | and 35 parts of quartz having the following particle sizing:

| | |
|---|---|
| plus 40 mesh screen | 38 |
| minus 40 plus 50 mesh screen | 52 |
| minus 50 plus 70 mesh screen | 8 |
| minus 70 plus 100 mesh screen | 1. |

* * * * *